United States Patent [19]

Stidham et al.

[11] 3,777,058

[45] Dec. 4, 1973

[54] OPERATOR POSITIONS HAVING BOTH DEDICATED AND SHARED LOOP FACILITIES

[75] Inventors: James Richard Stidham, Broomfield; Louis Emanuel Thelemaque, Longmont, both of Colo.

[73] Assignee: Bell Telephone Laboratories, Incorporated, Murray Hill, N.J.

[22] Filed: July 27, 1972

[21] Appl. No.: 275,726

[52] U.S. Cl. ......................... 179/27 CA, 179/27 FF
[51] Int. Cl. ............................................ H04m 3/22
[58] Field of Search ..................... 179/27 CA, 27 FF

[56] References Cited

UNITED STATES PATENTS 3,341,661 9/1967 Curtis ............................ 179/27 FF
3,643,033 2/1972 Smithers ........................ 179/27 CA

*Primary Examiner*—William C. Cooper
*Attorney*—W. L. Keefauver et al.

[57] ABSTRACT

A switching system having operator positions is disclosed in which the position loop circuitry is separate and apart from the operator position circuitry. The loop circuits are arranged so that each operator has access to a plurality of dedicated loops individual to her position as well as access to a plurality of shared loops which are common to and shared by all positions.

16 Claims, 8 Drawing Figures

OPERATOR POSITIONS HAVING BOTH DEDICATED AND SHARED LOOP FACILITIES

BACKGROUND OF THE INVENTION

1. Field of the Invention

Figures 1A, 1C:
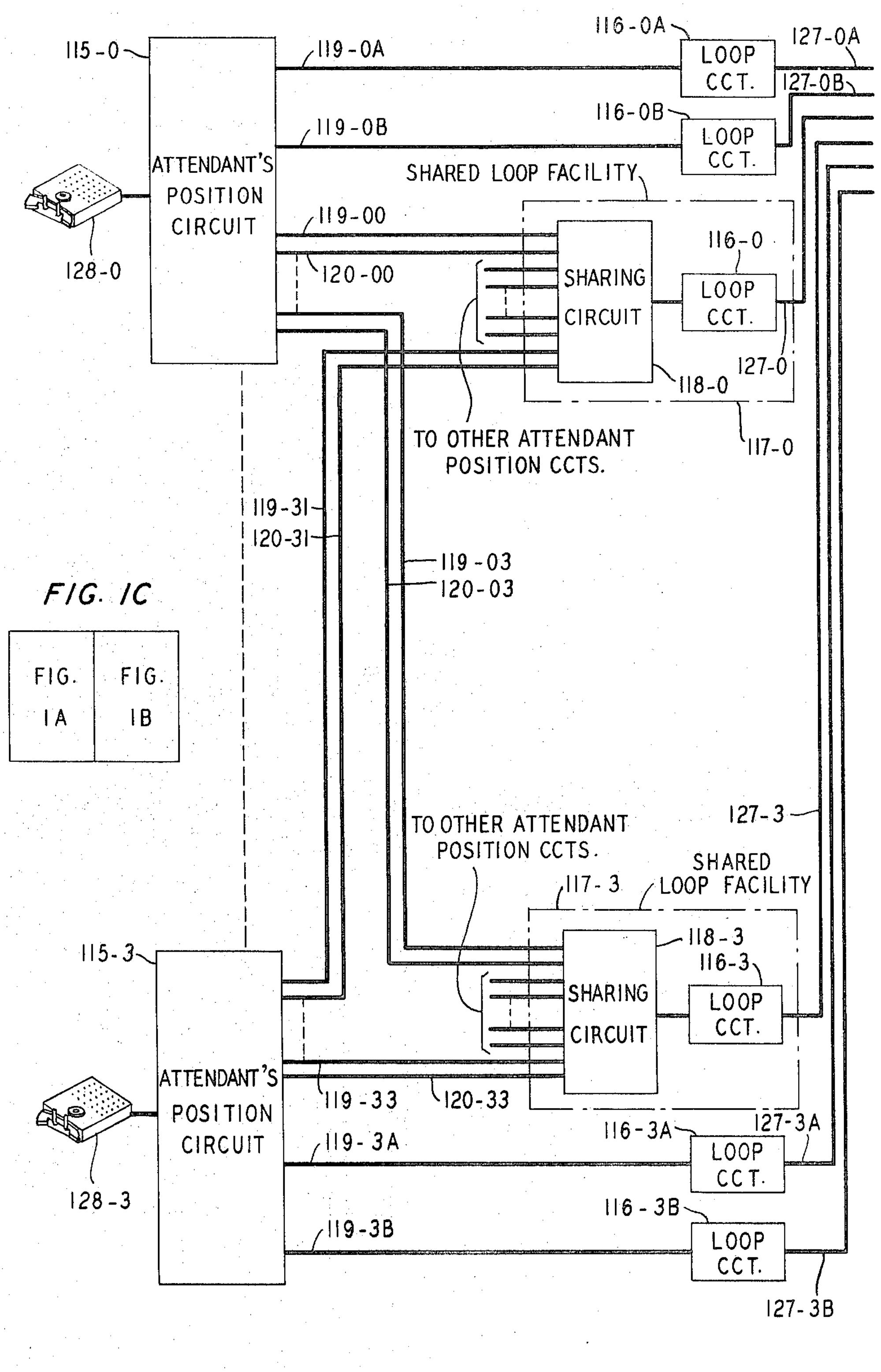

This invention relates to a switching system and, in particular, to a system having facilities for serving calls that require operator assistance for their completion.

This invention further relates to a system having operator positions that are equipped to permit each operator to supervise a plurality of calls at a time.

2. Description of the Prior Art

In switching systems having operator or attendant positions it is known to provide a plurality of loop circuits at each position so that an operator may concurrently serve a plurality of calls. This enables each operator to receive a new call on an idle one of her loop circuits and, at the same time, to monitor or to supervise the status of priorly received calls which have been placed in a hold state on others of her loop circuits.

Each position includes lamps so that an operator can monitor the on-hook and off-hook state of all parties involved on calls connected to any of her loops. Each position also contains keys, relays, and circuitry which permits an operator to transfer a call on any loop from an active to a hold state, to receive a call directed by the system to any of her loops, and to initiate an outgoing call on any one of her idle loops. Each loop circuit contains supervision and call splitting circuitry which enables an operator to connect or disconnect the calling and called parties speechwise while, at the same time, retaining the ability for herself to talk to either party.

Loop circuits are inherently expensive since they contain much of the circuitry and equipment required for the serving of a call at a position. Consequently, it is desirable to equip the positions of each installation, such as a PBX, with only the quantity of loop circuits required for reliable and satisfactory service. The method commonly used to determine the number of loop circuits required at each position is to (1) determine the traffic load the system must serve as well as the number of operator positions that will be provided to serve this traffic, (2) determine the number of loops the system as a whole requires to serve the anticipated traffic, and (3) distribute the determined number of loops equally among the provided positions.

Although the foregoing procedure equitably distributes the loops among the positions, it does not prevent the possibility of blocking situations in which idle loop circuits are available, but yet, no further calls can temporarily be served by the system even though one or more operators are not currently serving active calls. Specifically, blocking situations may occur when certain positions have all of their loops occupied with held calls while, at the same time, all other positions have one of their loops busy with an active call, but also have one or more of the remainder of their loops idle. Thus, even though certain positions have one or more idle loops, no further calls that require operator assistance can be served until a held or an active call is released.

The foregoing described blocking conditions are caused by the fact that calls are distributed to the positions without regard to the operator effort required for each call. Certain positions may receive a series of calls with each call requiring operator assistance for only a brief period of time. On such alls, the operator performs the service required and releases from the connection so that she may be available to serve another call. Other positions may receive a series of calls with each call requiring that it be placed on hold for a prolonged period of time. On these calls, the operator renders the initial services required, places the call on hold, and supervises the call by means of her loop lamps until its conclusion or until further assistance is required. After an active call is placed on hold, the operator is free to receive a new call on any remaining ones of her idle loops. However, after all her loops become occupied with held calls, the operator is unable to receive any additional calls until one of the held calls is released from her position. As already mentioned, it is possible for all loops of one position to be busy with held calls even though there may be one or more idle loops available at other positions.

Since it is impossible to determine which positions will receive short holding time calls and which positions will receive more than their share of calls that must be placed on hold, system blocking cannot be prevented merely by equipping each position with its aliquot share of the total number of loops required by the system. Also, it is not an economically acceptable expedient to equip each position with an increased number of loops so that, regardless of the number of long holding time calls that may be received, another loop will always be available to receive an active call. This would require that the system as a whole be equipped with an economically prohibitive quantity of loop circuits It is, therefore, apparent that it is a problem in the presently available systems to equip operator positions with the number of loops circuits required for adequate service at each position but, at the same time, to equip the entire group of positions with only the number of loop circuits required to serve the anticipated system traffic.

BRIEF SUMMARY OF THE INVENTION

OBJECTS

It is an object of the invention to provide improved position loop facilities.

It is a further object to provide loop facilities for positions that receive a large number of long holding time calls.

SUMMARY DESCRIPTION

We provide a system in which the loop circuits are not a part of the operator position circuitry but, instead, are situated intermediate the operator positions and the switching facilities that connect the positions to trunk circuits serving calls that require operator assistance. In accordance with our invention, each position is connected to an individually associated with a plurality of dedicated loop circuits. Each dedicated loop circuit is connected to and serves calls for only a single position. Each position also has access to or is connectable to a plurality of shared loop circuits which are common to and available for use by all positions. The dedicated loop circuits insure that each position will have access to a minimum number of loop circuits during busy periods of the system. The shared loop circuits insure that any position that receives a disproportionate number of long holding time calls will have access to the additional loop circuits required to serve these calls.

In a typical installation, each position may have facilities (keys and lamps, etc.) for six loop circuits. Experience has shown that this is the maximum number of loops that can efficiently be served by an operator. Of the six loop facilities, two are associated with the dedicated loops of the position; the remaining four are associated with the shared loops. The dedicated loops are first preferred by the system and are normally used during periods of light traffic. The dedicated loops by themselves permit an attendant to receive and place a call on hold on one dedicated loop, observe the call status by the loop lamps, and, at the same time, remain free to receive and serve another call on her other dedicated loop. However, after an attendant receives two calls in succession which must be placed on hold, any additional calls are received via one of the shared loops.

Each shared loop circuit is associated with a preference circuit which arranges the various operator positions in a predetermined order of preference so that each position is first preferred by at least one shared loop circuit. These facilities (1 ) provide an equitable distribution of calls that are extended via the shared loops to the positions, and (2) provide all positions with equitable access to the shared loops for calls initiated by the operators.

The provision of loop circuits on both a dedicated and shared basis in accordance with our invention minimizes the number of loop circuits a system requires to provide reliable and satisfactory service. At the same time, our invention also enables any position that receives an abnormal number of long holding time calls in succession to have access to the number of loops required to serve these calls. This precludes the necessity of equipping each and every position with an extraordinarily large number of loop circuits.

FEATURES

A feature of our invention is the provision of a switching system having attendant positions together with dedicated loop circuits individual to each position as well as shared loop circuits common to all positions.

A further feature is the provision of facilities for routing calls to a position over an idle dedicated loop circuit individual to the position or over any idle shared loop circuit when all dedicated loop circuits for the position are busy.

A further feature is the provision of switching facilities and a preference circuit for arranging each position in a different preferred order of availability with respect to each shared loop circuit so that each call received by a shared loop circuit is extended through the switching facilities to a preferred idle position.

A further feature is the provision of a plurality of loop facilities at each position with each position having a facility for each dedicated loop circuit unique to the position as well as a facility unique to each shared loop circuit.

A further feature is the provision of a system in which incoming central office calls directed to a PBX station are first routed over a switching network separate from that of the main PBX network to an idle attendant position via one of the dedicated loop circuits if idle, and via one of the shared loop circuits if all dedicated loop circuits for the position are busy.

A further feature is the provision of a system in which attendant originated connections may be established to an attendant trunk circuit of the PBX via either a dedicated loop circuit and the separate switching network or, alternatively, via s shared loop circuit and the network.

DRAWING

Figure 1B:
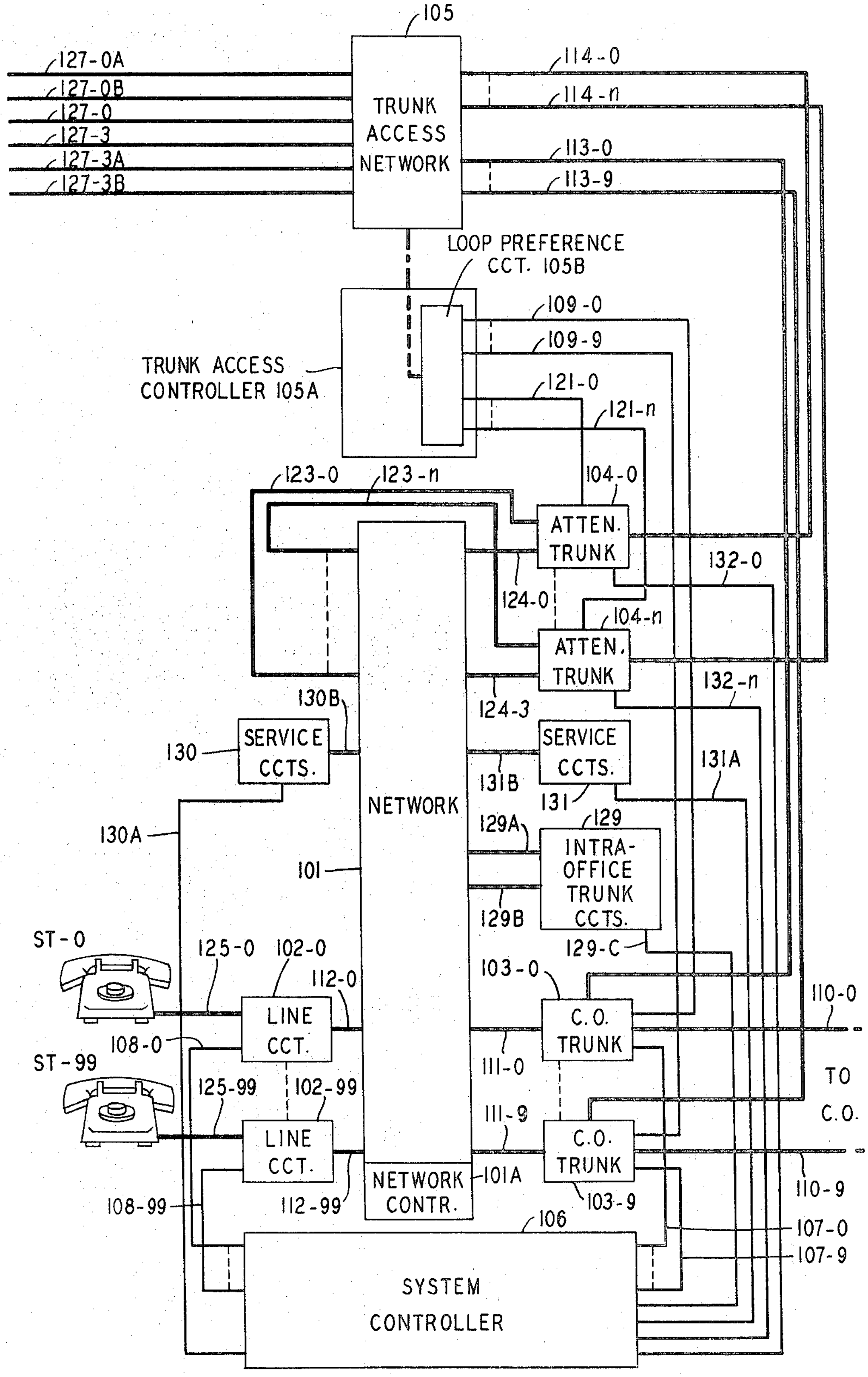

These and other objects and features of the invention will become more apparent upon the reading of the following description thereof taken in conjunction with the drawing in which FIGS. 1A and 1B, when arranged as shown in FIG. 1C, disclose a system that includes an illustrative embodiment of our invention;

FIGS. 2A, 2B, 2C, 3, and 4 disclose additional details of the system of FIG. 1.

GENERAL DESCRIPTION - FIGS. 1A and 1B

One possible embodiment of our invention is shown on FIGS. 1A and 1B as included in a PBX having stations ST0 through ST99, corresponding line circuits 102-0 through 102-99, a switching network 101, central office trunk circuits 103-0 through 103-9, attendant trunk circuits 104-0 through 104-n, and a plurality of lines 110-0 through 110-9 each of which extends from a corresponding one of the central office trunk circuits to the central office serving the PBX of FIG. 1. The system also includes intraoffice trunk circuits such as trunk circuit 129, line side service circuits 130, and trunk side service circuits 131. The PBX further includes a controller 106 which cooperates with the other elements shown on FIG. 1 to control the system operation in the performance of its call serving functions.

The system of FIG. 1 is effective to serve various types of calls including (1) intra-PBX calls between any two stations of the PBX, (2) outgoing calls to the central office, and (3) incoming calls from the central office. Intra-PBX calls are completed from a calling station, through its line circuit, through a first path of the switching network 101, through an intraoffice trunk circuit 129, over a second path of the network 101, to the called line circuit, and from there to the called station. Outgoing central office calls are extended from the calling station and its line circuit, through the network 101, through an idle central office trunk circuit 103-, and over the associated line 110- to the central office. Incoming central office calls that do not require operator assistance are extended from the central office trunk circuit 103- that receives the call, through the switching network 101, to the called line circuit and, in turn, to the called line.

the manner in which the system of FIG. 1 serves the foregoing types of calls does not comprise any part of our invention, is well-known in the art, and is therefore not described in further detail.

The system of our invention further and illustratively includes four operator or attendant positions 128-0 through 128-3, four associated attendant position circuits 115-0 through 115-3, a plurality of loop circuits 116-, and a trunk access network 105. The trunk access network functions to complete a path between the positions and the trunk circuits serving calls that require operator assistance. On incoming central office calls that require assistance, a path is completed from the calling CO trunk circuit 103- via the access network 105 and an idle loop circuit 116- to the operator position selected to serve the call. On operator originated calls, a path is completed through a loop circuit and the access network 105 to one of the attendant trunk circuits 104-.

The present invention relates to the manner in which the operator positions are equipped with loop facilities so that each operator may receive and serve a new call on one of her loops while she monitors the state of one or more held calls on others of her loops. The loop circuits are not an integral part of the position circuits 115-. Instead, they are separate circuits 116- which are positioned intermediate the position circuits 115- and the trunk access network 105. As shown on FIGS. 1A and 1B, each attendant position is individual to and directly connected to two dedicated loop circuits. Thus, position 0 (128-0) is connected via its position circuit to the two dedicated loop circuits 116-0A and 116-0B. These two loop circuits exclusively serve calls directed to or originated at position 0.

The system of our invention also includes a plurality of shared loop facilities 117- which are common to and available for use by any attendant position. Four such shared loop facilities are shown and are designated 117-0 through 117-3. Each such facility includes a sharing circuit 118- and a loop circuit 116- such as, for example, sharing circuit 118-0 and loop circuit 116-0 within the shared loop facility 117-0. By means of the sharing circuits, each shared loop may be connected to any attendant position. Thus, shared loop 116-0 may be connected via sharing circuit 118-0 to position 0 over the speech path 119-00 and the control path 120-00. Alternatively, it may be connected to position 3 over speech path 119-30 and control path 120-30. Similarly, the shared loop 116-3 may be connected via its sharing circuit 118-3 to any attendant position.

Each sharing circuit 118- includes preference circuitry which arranges the positions in a predetermined order of preference for incoming calls. Each sharing circuit arranges the positions in a unique order so that the incoming traffic received by the system is directed to the various positions on an equitable basis. Thus, sharing circuit 118-0 may arrange the four positions in a preference of 0, 1, 2, and 3 while sharing circuit 118-4 may arrange the four positions in a preference of 3, 2, 1, and 0.

The following describes the operation of the system comprising our invention in further detail and, in particular, describes the manner in which connections from calling trunk circuits are established to the operator positions via the dedicated and shared loop facilities. Let it initially be assumed that an incoming call requiring operator assistance is received by central office trunk circuit 103-0; let it also be assumed that all loops of position 128-0 (position 0) are idle; let it further be assumed that this position is selected by the system to serve the call.

Upon the receipt of this call, trunk circuit 103-0 transmits a signal over conductor 109-0 to trunk access controller 105A requesting a connection to an operator position. The controller responds to this request and determines what positions having idle loops are currently available. Controller 105A includes a loop prefernce circuit 105B which arranges the dedicated and the shared loop circuits in a predetermined order of preference so that the dedicated loops are preferred over the shared loops if both types are idle. In other words, a call connection will be established via a shared loop circuit only if no dedicated loop circuit is idle.

It has been assumed that the presently described call is to be directed to position 0 and that all of its loop facilities are idle. In this case, after the controller determines that the call is to be directed to position 0, it establishes a network connection between conductors 113-0 of trunk 103-0 and conductors 127-0A which extend to the dedicated loop circuit 116-0A of position 0. From there, the call is extended through the loop circuit and over path 119-0A to position circuit 115-0 and, in turn, to position 0. The receipt of this call at the position causes its lamps associated with loop 116-0A to light to indicate the call receipt to the operator. She then serves the call in the conventional manner and, as long as she actively serves the call, her position cannot receive calls on any of its other loops. If the call is of the short holding time type in that it requires only the momentary services of an operator, she performs the services required and then releases her position from the connection. This breaks down the trunk access network connection between the dedicated loop circuit 116-0A and the central office trunk circuit 103-1. Upon the release of this connection, all loops of position 0 are available to serve a new call.

Alternatively, the currently described call may be of the long holding time type; for example, it may require that the operator monitor the call after it is extended to the called station. In this case, the operator places the call on hold and the loop circuit 116-0A and the associated loop facilities within position circuit 115-0 remain in use on the call for its duration. Position 0 is free to receive another call on any of its other loops as soon as the call served by loop circuit 116-0A is placed on hold. Thus, another call may then be extended via the trunk access network 105 to dedicated loop 116-0B and through it to the position 0. The operator serves this new call in the conventional manner and, at the same time, monitors the held call on dedicated loop circuit 116-0A.

Let it be assumed that the call extended to position 0 via loop circuit 116-OB also requires that it be placed on hold. As soon as this new call is placed on hold, both of the dedicated loops of position 0, loop circuits 116-0A and 116-0B, are occupied with held calls and the operator at position 0 monitors the status of these calls by means of her loop lamps.

Since both of the dedicated loops of position 0 are occupied with held calls, any further calls directed to position 0 at this time obviously must use the shared loop facilities. Let it be assumed that another call is now received from the central office; let it also be assumed that all other positions are currently serving active calls and that, therefore, this call must be directed to position 0. The trunk access controller 105A now determines that both of the dedicated loops 116-0A and 116-0B of position 0 are busy and that one of the shared loop facilities 117-0 through 117-3 must be used. Let it be assumed that shared loop facility 117-0 is selected. This being the case, the controller establishes a network connection between path 127-0 and the path 113- of the calling trunk circuit 103-. In a manner subsequently described in detail, shared loop facility 117-0 detects the receipt of the call and activates the sharing circuit 118-0 to connect loop circuit 116-0 with position 0 via paths 119-00 and 120-00. The operator serves this call in the conventional manner when it is received at her position. She may also place this call on hold and thereby make her position available for the serving of other calls.

As long as both of her dedicated loops remain busy with held calls, any new calls must be directed to her position by means of idle shared loop facilities. Each position is equipped with equipment, such as lamps and keys, for six loops and, therefore, it is possible for an operator to serve six calls concurrently. Of the six, five must be calls in a hold state; the sixth can be a call in either an active or a held state. The concurrent serving of six calls at a position would require the use of the two dedicated loops of the position as well as all four of the shared loop facilities 117-0 through 117-3. The use of all of the shared loop facilities by position 0 would leave the remaining three positions with the use of only their dedicated loop circuits. Subsequently, as soon as one of the calls served by the shared loops is released from position 0, the loop becomes available for the serving of another call.

As already mentioned, the sharing circuits include preference facilities with each sharing circuit 118- being effective to arrange the four operator positions in a different order of preference. Thus, sharing circuit 118-0 may first prefer position 0 and last prefer position 3; sharing circuit 118-4 may first prefer position 3 and last prefer position 0. This arrangement insures that the calls served by the shared loops will be distributed on an equitable basis to all positions, and conversely insures that all positions will have equitable access to the shared loops for the operator initiated calls.

Figures 2A, 2C:
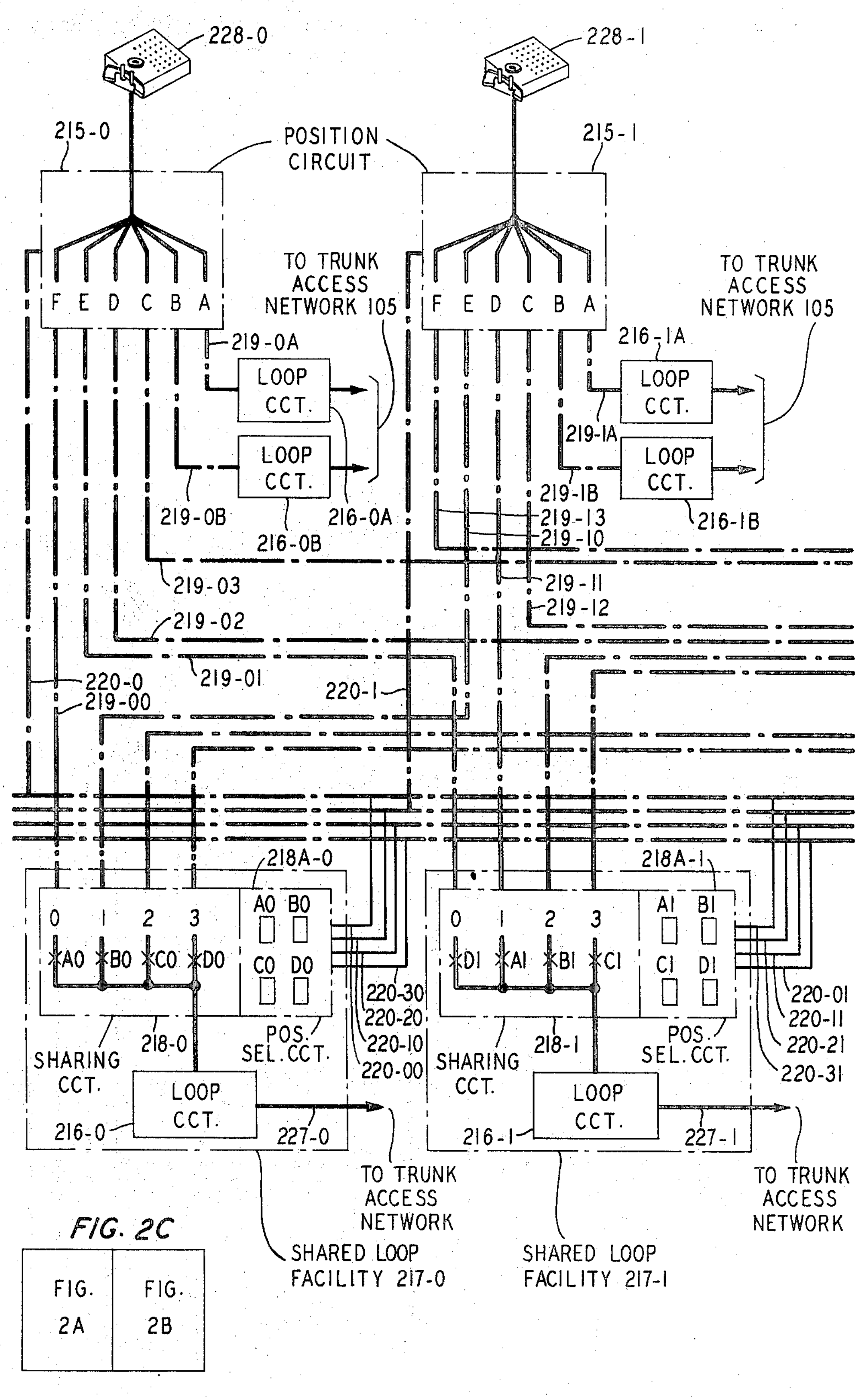
Figure 2B:
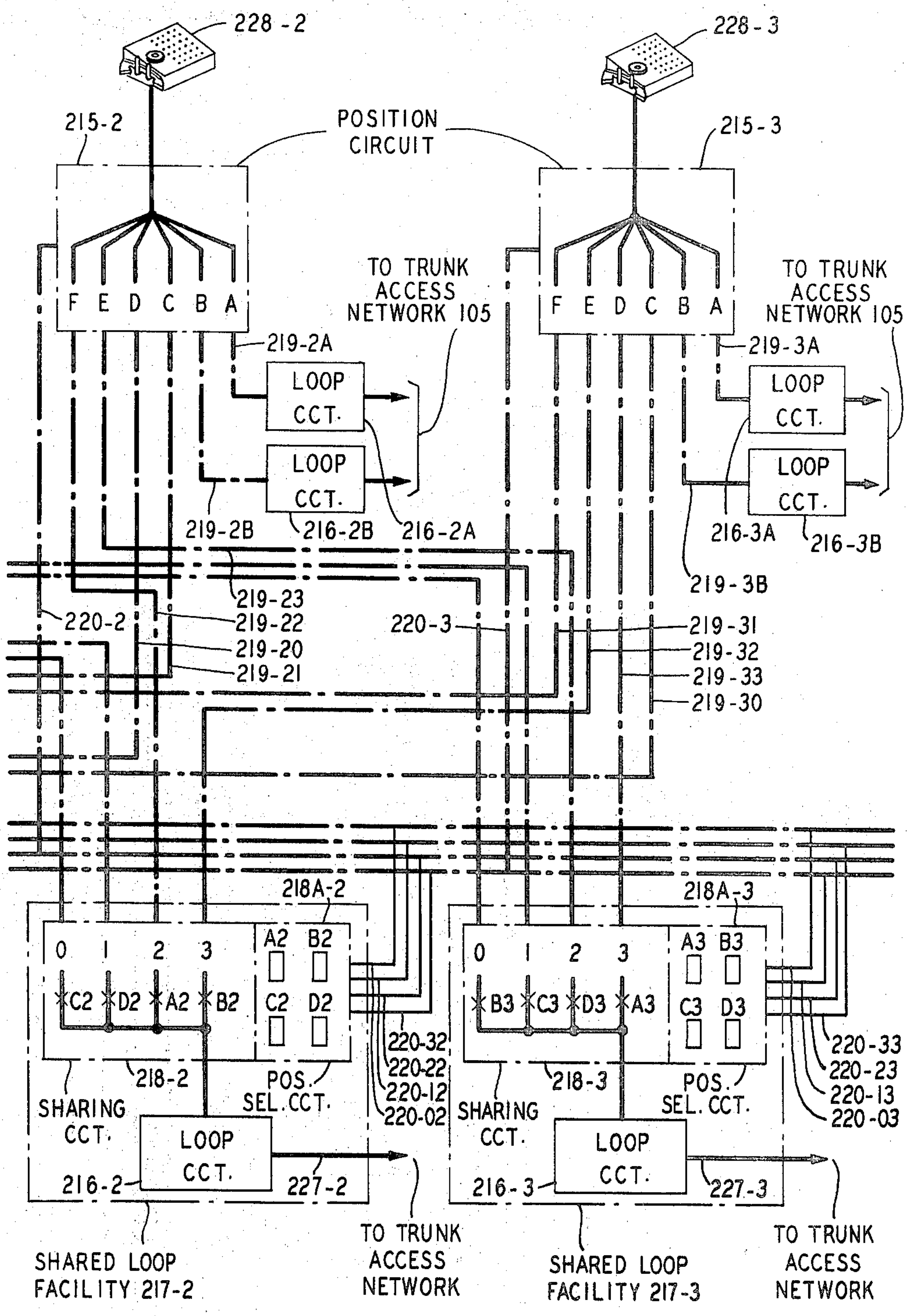

DESCRIPTION OF FIGS. 2A and 2B

FIGS. 2A and 2B illustrate further details of the interconnections between the attendant positions, the position circuits, the dedicated loop circuits, and the shared loop facilities. Each element on FIG. 2 that directly corresponds to an element on FIG. 1 is designated in a manner that facilitates an appreciation of the correspondence. For example, position circuit 215-0 on FIG. 2A corresponds to position circuit 115-0 on FIG. 1A.

In the same manner as FIG. 1, FIG. 2 discloses four attendant positions, four position circuits, two dedicated loops for each position, and four shared loop facilities each of which contains a loop sharing circuit and a loop circuit and each of which is available for connection to any attendant position. The various elements on FIG. 2 are interconnected by conductors and by conductor paths that for the most part have a one-for-one correspondence with elements of FIG. 1. Therefore, no detailed description of these interconnections is necessary other than the fact that the conductor path extending from the right side of each loop circuit is to be understood as extending to the trunk access network which is not shown on FIG. 2, but which is shown on FIG. 1 as element 105.

Each loop sharing circuit such as 218-0 contains make contacts of four relays designated A0, B0, C0, and D0. The controlling relays for these contacts are similarly designated and are included within the position select circuit 218A-1 for loop sharing circuit 218-0. These relays and their make contacts constitute a preference circuit in which the order of preference is A, B, C, and D respectively. Each loop circuit within a shared loop facility, such as loop circuit 216-0, is connected to one of the attendant position circuits upon the closure of any one of the A-, B-, C-, and D- make contacts in its associated sharing circuit.

The remaining shared loop facilities, namely, 217-1, 217-2, and 217-3, are similar to 217-0 except that the make contacts of their relay preference circuits arrange the four operator positions in a different order of preference for each loop circuit. Thus, for loop sharing circuit 218-0, the order of preference is positions 0, 1, 2, and 3 in that order; the order of preference for loop sharing circuit 218-1 is positions 1, 2, 3, and 0; for loop sharing circuit 218-2 the order is positions 2, 3, 0, and 1; and for loop sharing circuit 218-3 the order is positions 3, 0, 1, and 2 respectively.

With the above-described preference arrangement, an incoming call received by shared loop facility 217-0 will first prefer position 0; a call received by loop facility 217-1 will first prefer position 1, etc.

DESCRIPTION OF FIG. 3

Figure 3:
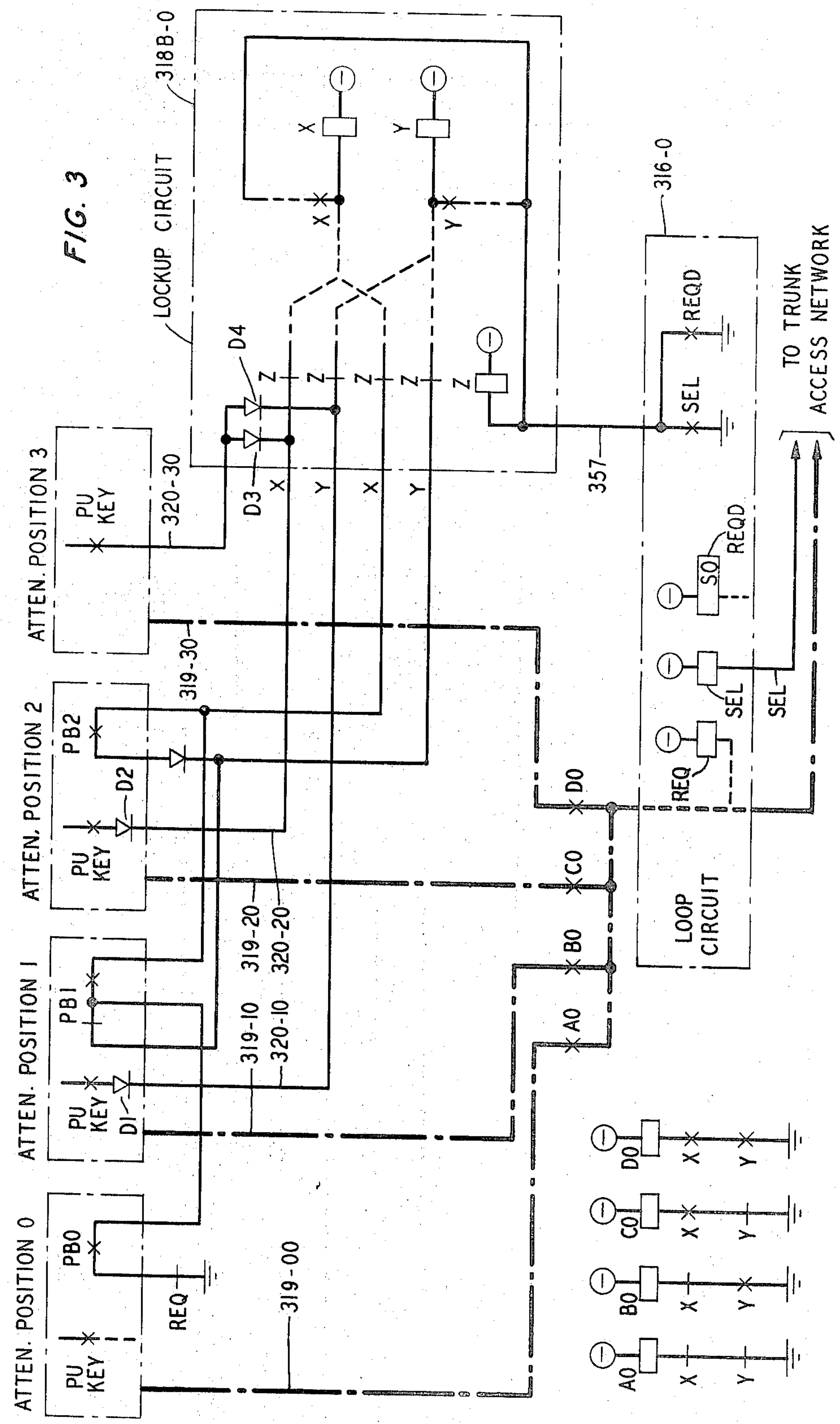

FIG. 3 illustrates a loop sharing circuit as well as further details of the interconnections between the position circuits and the loop sharing circuits. It also discloses the circuitry within the loop sharing circuits which arrange the positions in a stated order of preference. In order to minimize its complexity, FIG. 3 illustrates only a single loop sharing circuit together with the manner in which this circuit is connected to the loop facilities of each position. A system having four shared loop facilities will have four of each of the circuit elements shown on FIG. 3. The loop sharing circuit comprises all of the circuitry of FIG. 3 with the exception of the elements in the rectangles representing the loop circuit and the four attendant positions.

In order to facilitate an appreciation of the correspondence with elements on FIGS. 1 and 2, it has been assumed that the loop sharing circuit shown on FIG. 3 corresponds to element 218-0 on FIG. 2 and 118-0 on FIG. 1. This loop sharing circuit functions to connect the loop circuit 316-0 with any of the four positions in a stated order of preference with position 0 being first preferred and position 3 being least preferred. The loop circuit is connected to a position upon the closure of any of the make contacts of relays A0, B0, C0, or D0. The operation and release of these relays is controlled by relays X and Y within the lockup circuit 318B-0.

Upon examination of the operating circuitry for relays A0, B0, C0, and D0, it may be seen that (1) relay A0 operates whenever both relays X and Y are released, (2) relay B0 operates when relay X is released while relay Y is operated, (3) relay C0 is operated whenever relay X is operated while relay Y is released, and (4) relay D0 is operated whenever both of relays X and Y are operated. The normal state of the circuit is for relays X and Y to be released and for relay A0 to be operated. This maintains a connection between loop circuit 316-0 and position 0 and, thereby, gives this position first preference to the loop circuit.

Relays X and Y together with relays A0, B0, C0, and D0 constitute a dynamic preference circuit. This circuit monitors the busy state of the four positions, controls the state of the A0, B0, C0, and DO relays, and maintains the idle loop circuit 316-0 connected to the most preferred position that is idle. The PB- contacts in each position supply the X and Y relays with information indicating the current busy-idle state of the positions. Four of the conductors extending into the left-side of the lockup circuit are designated X, Y, X, Y. A ground potential on one or more of these conductors operates either the X and/or the Y relay in accordance with the designation of the conductor or conductors receiving the ground potential. The PB- contact of each position is operated when its position is busy. With no position busy, none of the X or Y conductors extending into the lockup circuit are grounded and neither of the X or Y relays is operated. The contacts of these two relays when they are released maintain A0 operated. This maintains the loop circuit 316-0 connected to position 0 and any incoming central office calls received by the loop circuit will be directed to position 0.

When only position 0 is busy, a ground is extended through its contacts PB0 and through the break contacts PB1 of position 1 to the Y conductor. This operates relay Y while position 0 remains busy. With relay Y operated, relay A0 releases and relay B0 operates. The closed make contacts B0 maintain the loop circuit connected to position 1 for incoming calls. In a similar manner, when both positions 0 and 1 are busy, the PB0 and PB1 contacts ground conductor X, hold relay X operated, hold relays A0 and B0 released, and hold relay C0 operated. This maintains the loop circuit connected to position 2. When positions 0, 1, and 2 are busy, the PB0, PB1, and PB2 contacts ground both conductors X and Y to hold both X and Y relays operated. This holds relay D0 operated so that the loop circuit is connected to position 3. The PB- contact chain is disabled as soon as position 0 becomes idle regardless of the state of the other positions. At such times both relays X and Y are normal and the contacts of operated relay A0 maintain the loop circuit connected to position 0.

Each position contains a PU (pickup) key which is operated when an operator wishes to obtain the services of a loop circuit or to receive a call directed to her position via a loop circuit. The PU key contacts on FIG. 3 are effective only on operator initiated calls; they serve no useful function on incoming calls.

On incoming calls, the SEL contacts within the loop circuit are operated when the system establishes a network connection to he loop circuit. These contacts apply a ground to conductor 357 to operate relay Z and to provide a holding path for any of the X or Y relays that are currently operated. The operation of relay Z opens its make contacts within the lockup circuit to isolate the conductors on the left-side of the lockup circuit from the operating paths for relays X and Y. This opens the operating paths for these relays. The conductor 357 holding ground for relays X and Y maintains them in their current operational state so that the call received by the loop circuit is directed to the most preferred idle position. For example, if neither relays X and Y are operated when the loop circuit receives a call, the operation of relay Z prevents any change of state of relays X and Y, relay A0 remains operated, and position 0 receives the call. On the other hand, if relays X and Y are operated when the loop circuit receives a call, the closure of make contacts SEL and the operation of relay Z, disable the operating paths for relays X and Y, maintain these relays in their operated state and, in turn, maintain relay D0 operated. The make contacts of relay D0 direct the call to position 3.

As already mentioned, the PU key contacts on position 3 are effective only for attendant operator calls. Let it initially be assumed that position 0 initiates a call by operating its PU key. The resultant ground on conductor 320-00, by itself, results in no circuit operations within the lockup circuit on FIG. 3. Instead, as it is subsequently described in FIG. 4, the operation of this key operates relay REQ which, in turn, after a time delay operates relay REQD. The operation of relay REQ opens its break contacts on FIG. 3 to disable the PB- chain and to release any of relays X and Y that may have been operated. The subsequent operation of relay REQD causes its make contacts within the loop circuit to apply a ground to conductor 357 which operates relay Z. Relay Z opens its break contacts to disable the operating paths for relays X and Y. This prevents them from responding to requests from other positions. Relay A0 remains operated at this time and the call initiated by position 0 is served by loop circuit 316-0 as subsequently described in FIG. 4.

Figure 4:
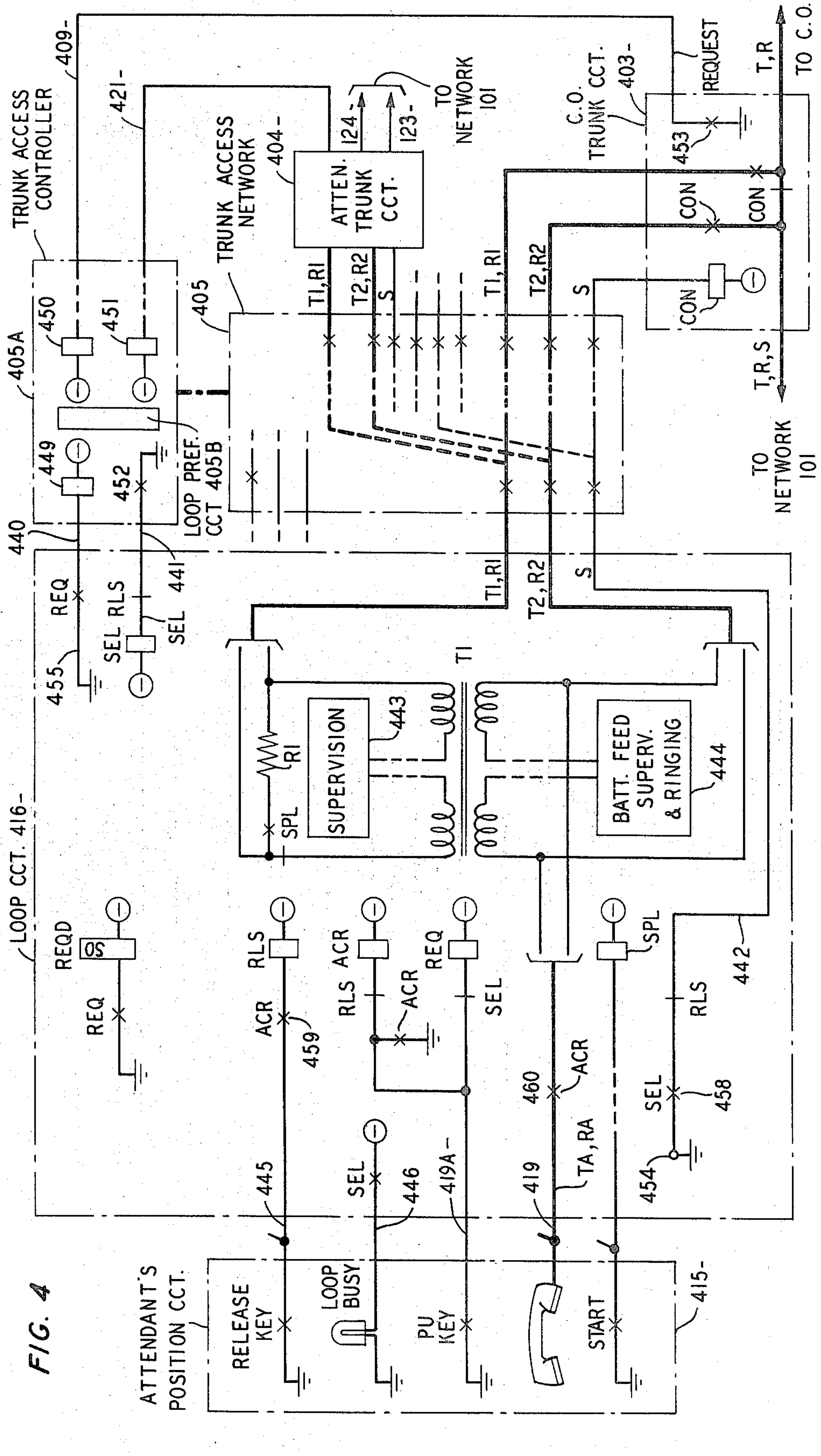

The operation of the PU key at position 1 applies a ground to conductor 320-10 to operate relay Y on FIG. 3 and relay REQ on FIG. 4. The operation of relay REQ opens its break contacts on FIG. 3 to release relay X in the event that it was operated while the subsequent operation of relay REQD operates relay Z and provides a holding path for relay Y. The operation of relay Z disables the operating paths for relays X and Y. Relay B0 is operated at this time, position 1 is connected to the loop circuit, and the call initiated at the position is extended by the loop circuit to the network.

In a similar manner the PU key for position 2 operates relay X while the depression of the PU key for position 3 operates relays X and Y. Relays REQ, REQD, and Z also operate at this time to perform the same functions as already described. In this case the call originated at position 2 or 3, as the case may be, is served by the loop circuit 316-0 via the make contacts of relays C0 or D0, respectively.

The foregoing description of FIG. 3 illustrates the manner in which loop circuit 316-0 and loop sharing circuit 318-0 arrange the four positions in a preferred order for the receipt of incoming calls. The remaining three shared loop circuits and loop sharing circuits operate in a similar manner to provide similar service to the four positions on the incoming and attendant originated calls served by these circuits.

DESCRIPTION OF FIG. 4

FIG. 4 illustrates further details of our invention and, in particular, further details of a loop circuit as well as the elements in the position circuit and the central office trunk circuit that communicate signalwise with the loop circuit. The various circuit elements on FIG. 4 are designated in a manner that facilitates their correspondence with elements on the other drawing figures.

The circuitry of FIG. 4 is eeffective to establish a network path between a loop circuit and a trunk circuit in response to a request from either circuit. A central office trunk circuit request is received over conductor 409- to operate relay 450 in controller 405A; an attendant trunk circuit requrest is received over conductor 421- to operate relay 451; a loop circuit request is received over conductor 440 to operate relay 449. The operation of any one of relays 449, 450, or 451 causes the controller to establish the requested network connection.

Let it first be assumed that the CO trunk circuit on the lower right-hand corner of FIG. 4 receives an incoming call that requires assistance. In this case, it closes its make contacts 453 (of a relay whose winding is not shown) to operate relay 450 in controller 405A which, in turn, establishes a path between the CO trunk circuit and an idle loop. Let it be assumed that this path is established by the network 405 to the loop circuit shown on the left side of FIG. 4.

The controller closes its make contacts 452 (of a relay whose winding is not shown) to operate relay SEL in the loop circuit when the path is established. The operation of relay SEL closes its make contacts to light the loop busy lamp as an indication to the operator that a call is extended to this loop of her position. Make contacts 458 of the SEL relay operate to apply a ground through break contacts RLS to conductor 442. This ground is extended through the sleeve (S) lead of the network connection to operate relay CON in the CO trunk circuit. The operation of this relay closes its transfer make contacts to extend the speech paths of the trunk circuit through the network 405 to the conductor pairs T1, R1 and T2, R2 of the loop circuit. The calling party is connected over the T1, R1 pair to the supervision circuit 443 via transformer T1. When the operator answers the call, she operates the PU key which applies a ground to conductor 420-. This ground operates relay ACR which provides a holding path for itself through the break contacts of relay RLS. Relay REQ does not operate at this time since the break contacts of relay SEL are open. Make contacts 459 of relay ACR prepare an operating path for the relay RLS which operates when the operator depresses the release key at the end of the call. Relay ACR in operating closes its make contacts 460 to connect the operator's headset with the supervision circuitry 443 and the transformer T1 so that she may talk to the parties on the call.

In order to extend the call to the called PBX station, the operator depresses the start (ST) key and performs the required dialing operations. The operation of the ST key and the dialing activate the service circuits 456 which control the system operations required to establish a path between the network 101 appearance of the CO trunk circuit and the called PBX station. The depression of the ST key also operates relay SPL in the loop circuit. This relay closes its make contacts to provide a T1, R1 holding path for the central office side of the connection while, at the same time, permitting the operator to talk with the called station over the T2, R2 paths extending to the CO trunk circuit and from there through the network 101 to the called station.

Let it be assumed that no further operator assistance is required after the connection is established to the called station. In this case, the operator depresses the release key which grounds conductor 445 to operate relay RLS. The operation of relay RLS opens its break contacts to release relay SEL. This release of relay SEL extinguishes the loop busy lamp and, with the operation of relay RLS, removes the sleeve lead ground from conductor 442 to release relay CON in the CO trunk circuit. The release of relay CON releases its transfer make contacts and closes its transfer break contacts to disconnect the speech path of the trunk circuit from the attendant position and to connect the two ends of the trunk circuit speechwise and each other. The calling and called parties may now converse with each other. Since conductor 442 is the sleeve lead for the network connection, the removal of ground from this conductor at this time releases the network connection between the loop circuit of FIG. 4 and the CO trunk circuit. The operation of relay RLS in the loop circuit also opens its break contacts to release relay ACR. This opens the make contacts 460 of ACR to disconnect the position speechwise from the loop circuit and to free the position to serve other calls.

In a manner similar to that already described for an incoming call on a CO trunk, a station may dial the attendant, seize an attendant trunk, and request the attendant to establish an outgoing call. In this case, the sequence of operations in the loop circuit, as well as in the attendant trunk circuit, are analogous to that just described for the CO type call.

The following describes the operation of the circuitry of FIG. 4 for an attendant originated call. The attendant seizes an idle loop circuit by depressing the PU key for the loop. Let it be assumed that the loop involved is that one shown in detail on FIG. 4. This being the case, the operation of the PU key grounds conductor 420 to operate relays ACR and REQ. The operation of relay ACR closes its make contacts 460 to interconnect the attendant speech circuitry with the transmission circuitry of the loop circuit; it also closes its make contacts 459 to connect the RLS key of the position with relay RLS. The operation of relay REQ closes its make contacts to apply a ground to conductor 440 to operate relay 449 in the trunk access controller. This causes the controller to establish a network path between the loop circuit and an idle attendant trunk circuit. The controller closes its make contacts 452 to operate relay SEL within the loop circuit when the path is established. The operation of relay SEL (1) lights the loop bush lamp, (2) applies a sleeve ground to conductor 442 to operate the CON relay of the attendant trunk circuit, and (3) opens the operating path for relay REQ to release it and remove the request to the controller.

The operation of the CON relay of the attendant trunk circuit connects the speech circuitry of the loop circuit to the attendant trunk circuit. Since it has been assumed that the attendant initiated this connection, she may now either establish a call to a PBX station or, alternatively, she may establish a connection to a central office via a CO trunk circuit. The attendant trunk circuit as shown on FIG. 1 has connections or ports on both sides of network 101. The operator effects or initiates these operations by depressing the start key and then by performing the dialing operations required to establish the desired connections. If the attendant places a central office call, she typically dials 9, waits for the receipt of the dial tone, and then dials the remaining digits required to complete the connection. If she dials a PBX station, the ringing signal is supplied from element 444 of the switched loop, through the trunk access network 405, through the attendant trunk circuit, through the main switching network 101 to the called PBX station. The operator depresses the release key to release from this call in the same manner as priorly described for a CO type call.

The loop circuit shown on FIG. 4 is permanently connected to a position circuit and, thus, constitutes one of the dedicated loop circuits of the position. A shared loop circuit serves a call directed to or orginated at a position in the same manner as already described for FIG. 4 except that (1) the position circuit and the loop circuit are not directly connected to each other as shown on FIG. 4 but instead must be connected to each other by a sharing circuit 118-, and (2) the circuitry of FIG. 3 is operative to interconnect the position with a shared loop circuit via the contacts of one of the preference relays A0, B0, C0, or D0.

What is claimed is:

1. In a switching system, trunk circuits, attendant positions, a plurality of dedicated loop circuits with each of said positions having at least one of said dedicated loop circuits individual thereto, a plurality of shared loop circuits common to all of said positions, means for completing a call connection between any one of said trunk circuits and any one of said positions via the dedicated loop circuit individual to said one position, and means for completing a call connection between any one of said trunk circuits and any one of said positions via any one of said shared loop circuits.

2. The system of claim 1 in combination with switching means individual to each of said shared loop circuits, and means including said switching means responsive to a call received by any one of said shared loop circuits from a calling one of said trunk circuits for extending said call to an idle one of said positions.

3. The system of claim 2 in which said switching means includes a preference circuit for arranging said positions in a preferred order of availability with respect to each of said shared loop circuits, and means responsive to the receipt of a call by any one of said shared loop circuits for extending said call through said switching means to a most preferred idle one of said positions.

4. The system of claim 3 in which said preference circuit includes means for monitoring the current idle-busy state of each of said positions, and means responsive to said monitoring means for maintaining each of said shared loop circuits connected to an idle one of said positions that is most preferred by each of said shared loop circuits.

5. In a switching system, a switching network, trunk circuits connected to a first side of said network, attendant positions, a plurality of dedicated loop circuits with each of said positions having at least one of said dedicated loop circuits individual thereto, a plurality of shared loop circuits common to all of said positions, means for connecting each of said loop circuits to a second side of said network, means for completing a call connection through said network between any one of said trunk circuits and any one of said positions via the dedicated loop circuit individual to said one position, and means for completing a call connection through said network between any one of said trunk circuits and any one of said positions via any one of said shared loop circuits.

6. The system of claim 5 in combination with a plurality of call serving facilities at each of said positions with each of said positions having a facility for each dedicated loop circuit unique to said position as well as a facility unique to each of said shared loop circuits.

7. The system of claim 6 in combination with switching means individual to each of said shared loop circuits, a preference circuit individual to each of said positions for arranging said positions in a preferred order of availability with respect to each of said shared loop circuits, and means responsive to the receipt of a call by any one of said shared loop circuits for extending said call through said switching means to a most preferred idle one of said positions.

8. The system of claim 7 in which said preference circuit includes means for monitoring the current idle-busy state of each of said positions, and means responsive to said monitoring means for maintaining each of said shared loop circuits connected to an idle one of said positions that is most preferred by each of said shared loop circuits.

9. In a switching system, a switching network, central office trunk circuits connected to said network, attendant positions, a plurality of dedicated loop circuits connected to said network with each of said positions having at least one of said dedicated loop circuits individual thereto, a plurality of shared loop circuits connected to said network and common to all of said positions, means responsive to the receipt of a call by one of said trunk circuits for completing a call connection through said network between said one trunk circuit and any idle one of said positions via an idle dedicated loop circuit individual to said one position, and means effective when all of said dedicated loop circuits are busy for completing a call connection through said network between said one trunk circuit and any one of said positions via any idle one of said shared loop circuits.

10. The system of claim 9 in combination with a plurality of call serving facilities at each of said positions with each of said positions having a facility for each dedicated loop circuit unique to said position as well as a facility unique to each of said shared loop circuits.

11. The system of claim 10 in combination with attendant trunk circuits connected to said network, means for extending a call connection from any one of said positions through a dedicated loop circuit for said one position and through said network to any idle one of said attendant trunk circuits, and means for extending a call connection from any one of said positions through any one of said shared loop circuits and through said network to any idle one of said attendant trunk circuits.

12. The system of claim 11 in combination with switching means individual to each of said shared loop circuits, and means including said switching means responsive to a call received by any one of said shared loop circuits from a calling one of said central office trunk circuits for extending said call to an idle one of said positions.

13. The system of claim 12 in which said switching means includes a preference circuit for arranging said positions in a preferred order of availability with respect to each of said shared loop circuits, and means responsive to the receipt of a call by any one of said shared loop circuits for extending said call through said switching means to a most preferred idle one of said positions.

14. The system of claim 13 in which said preference circuit includes means for monitoring the current idle-busy state of each of said positions, and means responsive to said monitoring means for maintaining each of said shared loop circuits connected to an idle one of said positions that is most preferred by each of said shared loop circuits.

15. In a switching system, a first switching network having a line side and a trunk side, line circuits connected to said line side and central office trunk circuits connected to said trunk side, a system controller for controlling the establishment of network connections between said line circuits and said trunk circuits on calls initiated by said line circuits as well as on calls received by said trunk circuits from a central office, attendant positions, a trunk access network for establishing connections between calling ones of said central office trunk circuits and said attendant positions on calls from a central office, a plurality of dedicated loop circuits with each of said positions having at least one of said dedicated loop circuits individual thereto, a plurality of shared loop circuits common to all of said positions, means for connecting each of said loop circuits to said trunk access network, means for connecting each of said central office trunk circuits to said trunk access network, means responsive to the receipt of a call from a central office by one of said central office trunk circuits for completing a call connection through said trunk access network between said one central office trunk circuit and any idle one of said positions via an idle dedicated loop circuit individual to said one position, and means effective when all of said dedicated loop circuits of said one position are busy for completing a call connection through said network between said one trunk circuit and any one of said positions via any one of said shared loop circuits.

16. The system of claim 15 in combination with attendant trunk circuits each of which is connected to both said line side and said trunk side of said first network and each of which is also connected to said trunk access network, means for extending a connection from any one of said positions initiating a call through the dedicated loop circuit for said one position and through said trunk access network to any idle one of said attendant trunk circuits, means for extending a call connection to any one of said positions through any one of said shared loop circuits and through said trunk access network to any idle one of said attendant trunk circuits, said controller being responsive to the receipt of said call connection by said attendant trunk circuit for controlling the establishment of a connection through said first network to one of said central office trunk circuits on calls directed to said central office by an attendant at said position, said controller also being responsive to the receipt of said call connection to said attendant trunk circuit for controlling the establishment of a connection through said first network to one of said line circuits on calls directed to said one line circuit by said attendant.

* * * * *

UNITED STATES PATENT OFFICE

CERTIFICATE OF CORRECTION

Patent No. 3,777,058 Dated December 4, 1973

Inventor(s) James R. Stidham and Louis E. Thelemaque

It is certified that error appears in the above-identified patent and that said Letters Patent are hereby corrected as shown below:

Column 1, line 62, "alls" should read --calls--. Column 2, line 56, "an" should read --and--. Column 4, line 3, "s" should read --a--. Column 4, line 52, "the" should read --The--. Column 5, line 61, "fernce: should read --ference--. Column 8, line 58, "DO" should read --DO--. Column 9, line 40, "he" should read --the--. Column 11, line 60, after "speechwise" cancel "and" and insert --with--. Column 12, line 30, after "loop" change "bush" to --busy--.

Signed and sealed this 25th day of June 1974.

(SEAL)
Attest:

EDWARD M.FLETCHER,JR.
Attesting Officer

C. MARSHALL DANN
Commissioner of Patents